(12) United States Patent
Ito

(10) Patent No.: US 9,465,277 B2
(45) Date of Patent: Oct. 11, 2016

(54) LENS HOOD AND LENS APPARATUS INCLUDING THE SAME

(71) Applicant: CANON KABUSHIKI KAISHA, Tokyo (JP)

(72) Inventor: Shu Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/933,986

(22) Filed: Nov. 5, 2015

(65) Prior Publication Data

US 2016/0131961 A1 May 12, 2016

(30) Foreign Application Priority Data

Nov. 10, 2014 (JP) .................................. 2014-228486

(51) Int. Cl.
*G03B 11/04* (2006.01)
*G03B 17/14* (2006.01)

(52) U.S. Cl.
CPC ............ *G03B 11/045* (2013.01); *G03B 11/041* (2013.01); *G03B 17/14* (2013.01)

(58) Field of Classification Search
CPC .......................... G03B 11/045; G03B 11/041
See application file for complete search history.

(56) References Cited

U.S. PATENT DOCUMENTS

| 6,104,887 | A | 8/2000 | Hamasaki |
| 6,269,227 | B1 | 7/2001 | Hamasaki |
| 8,475,063 | B1 * | 7/2013 | Chang .................. G03B 11/045 359/511 |
| 2015/0131985 | A1 * | 5/2015 | Shodai ................. G03B 11/045 396/448 |

FOREIGN PATENT DOCUMENTS

| JP | H117058 A | 1/1999 |
| JP | H11295780 A | 10/1999 |
| JP | 2004264696 A | 9/2004 |
| JP | 2005221649 A | 8/2005 |

* cited by examiner

*Primary Examiner* — W B Perkey
(74) *Attorney, Agent, or Firm* — Canon U.S.A., Inc., IP Division

(57) ABSTRACT

There is provided a lens hood that, when attached to a front end portion of a lens barrel, enables easy operation of an optical member attached to the front end portion of the lens barrel and is strong against external shocks. The lens hood attachable to the front end portion of the lens barrel includes a hood body with which an opening is formed, an opening cover member configured to cover the opening, and a cover support member configured to slidably fix the opening cover member to the hood body, wherein the hood body or the cover support member includes a plurality of abutted portions to be abutted by the opening cover member in the sliding direction.

16 Claims, 14 Drawing Sheets

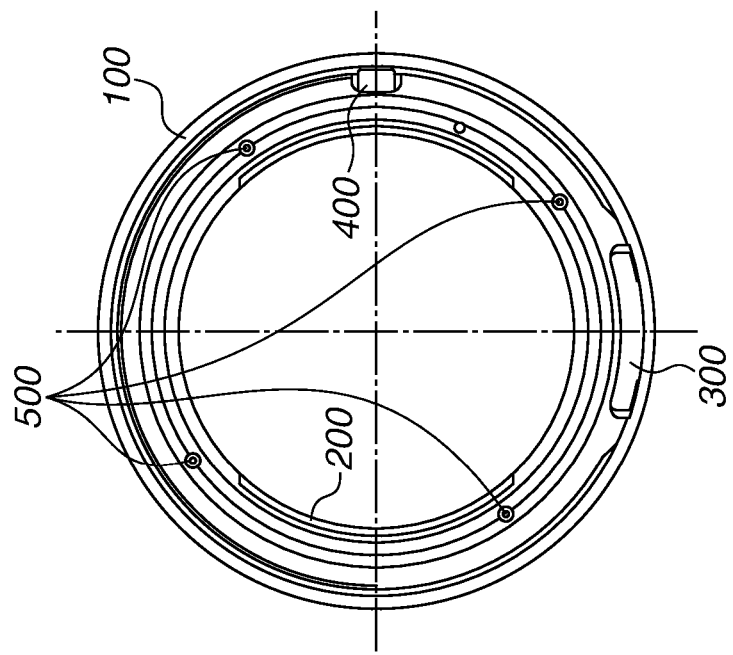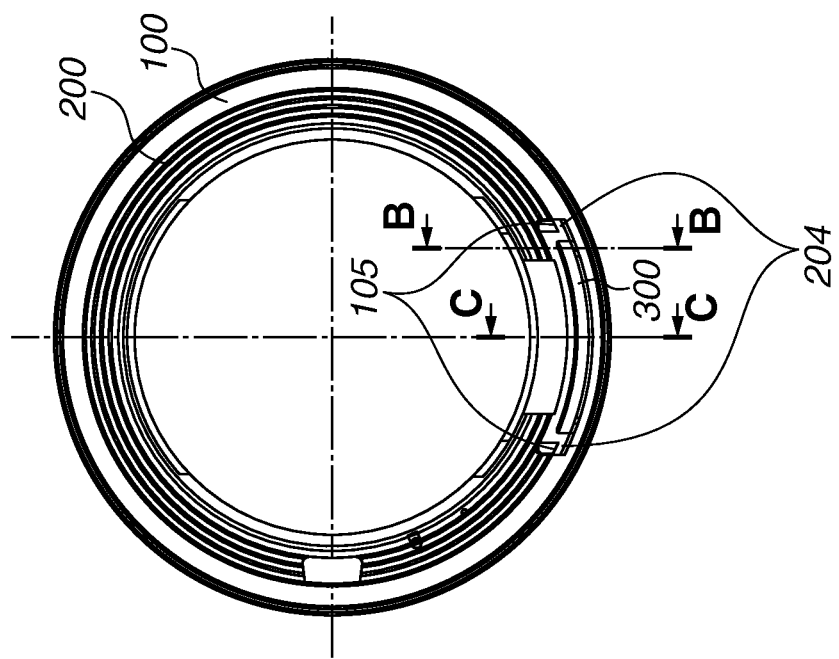

LENS HOOD AND LENS APPARATUS INCLUDING THE SAME

BACKGROUND OF THE INVENTION

1. Field of the Invention

The present invention relates to a lens hood attachable to a lens barrel.

2. Description of the Related Art

Conventionally, a lens hood is attached to a front end portion of a lens barrel to shield a camera lens from unwanted light coming from outside the angle of view of image-capturing, which causes flare and ghost. Further, various types of filters such as a polarization filter, a neutral density (ND) filter, a cross filter are attached to the front end portion of the lens barrel to increase photographic effects.

A rotation effect filter (optical member) is one of the various types of filters and can change the photographic effect by changing the position of rotation about an optical axis. In a case where a rotation effect filter is used in a single-lens reflex camera and the like, the photographer can check with a finder while changing the rotation position. Specifically, the configuration enables the photographer to check the photographic effect while performing rotational operation.

In general, a rotation effect filter includes a male screw member corresponding to a female screw member formed on an inner peripheral surface of a front end portion of a lens barrel, and the male screw member is screwed with the female screw member so that the rotation effect filter is attached to the front end portion of the lens barrel. Further, a lens hood is attached to the front end portion of the lens barrel by means of a structure (e.g., bayonet structure) provided on the outer peripheral surface of the front end portion of the lens barrel.

The lens hood is attached to the outer peripheral surface of the front end portion of the lens barrel and has a cylindrical shape including an opening on the side close to an object to be captured. Thus, the rotation effect filter attached to the inner peripheral surface of the front end portion of the lens barrel is covered around the optical axis by the lens hood.

Therefore, in order to perform rotational operation of the rotation effect filter when the lens hood is attached, the photographer needs to insert a finger into the opening of the lens hood on the side close to the object to be captured. Therefore, when the lens hood is attached, if the photographer operates the rotation effect filter while checking the object with a finder, light entering the lens barrel is partially blocked by the finger. This is not desirable for checking an image-capturing screen. Further, depending on the total length of the lens hood, it may be difficult to operate the rotary effect finder by inserting the finger into the opening on the side close to the object to be photographed.

To solve such a problem, U.S. Pat. No. 6,269,227 discusses a configuration including an opening through which a finger of the photographer can be inserted into a peripheral surface of a lens hood to operate a rotation effect filter and a lid member for closing the opening. Further, the lid member is linked to the lens hood by means of a hinge structure or trajectory structure (i.e., rail structure).

SUMMARY OF THE INVENTION

According to an aspect of the present invention, a lens hood attachable to a front end portion of a lens barrel, includes a hood body with which an opening is formed, an opening cover member configured to cover the opening, and a cover support member configured to slidably fix the opening cover member to the hood body, wherein the hood body or the cover support member includes a first abutted portion and a second abutted portion configured to abut against the opening cover member in a direction in which the opening cover member slides.

Further features of the present invention will become apparent from the following description of exemplary embodiments with reference to the attached drawings.

BRIEF DESCRIPTION OF THE DRAWINGS

FIGS. 9A and 9B are respectively a front view and a rear view illustrating the lens hood according to an exemplary embodiment of the present invention.

DESCRIPTION OF THE EMBODIMENTS

In a lens hood discussed in U.S. Pat. No. 6,269,227, a lid member is linked to a component of a main body of the lens hood by means of a hinge structure or trajectory structure. In the hinge structure, the lid member is configured to rotate, and when the lid member is in an opened state, the lid member is easily detached and damaged by external shocks, etc.

Further, in the trajectory structure, the lid member is supported on a trajectory of the component of the main body of the lens hood. Thus, the lid member is relatively strong against the action of external force in a direction orthogonal to an optical axis (radial direction of the lens hood). However, since the lid member is configured to be attached to the lens hood easily, the lid member is easily detached and damaged by shocks applied in the optical axis direction.

If the lid member is detached or damaged, the detachment or damage causes light to enter from an opening or a damaged portion. This makes it impossible to adequately satisfy the function to block unwanted light coming from outside the angle of view of image-capturing.

The present invention is directed to a lens hood that is strong against external shocks and allows easy operation of an optical member attached to a front end portion of a lens barrel when the lens hood is attached to the front end portion of the lens barrel.

Various exemplary embodiments of the present invention will be described in detail below with reference to the attached drawings.

A lens hood according to a first exemplary embodiment of the present invention will be described.

Figure 1:
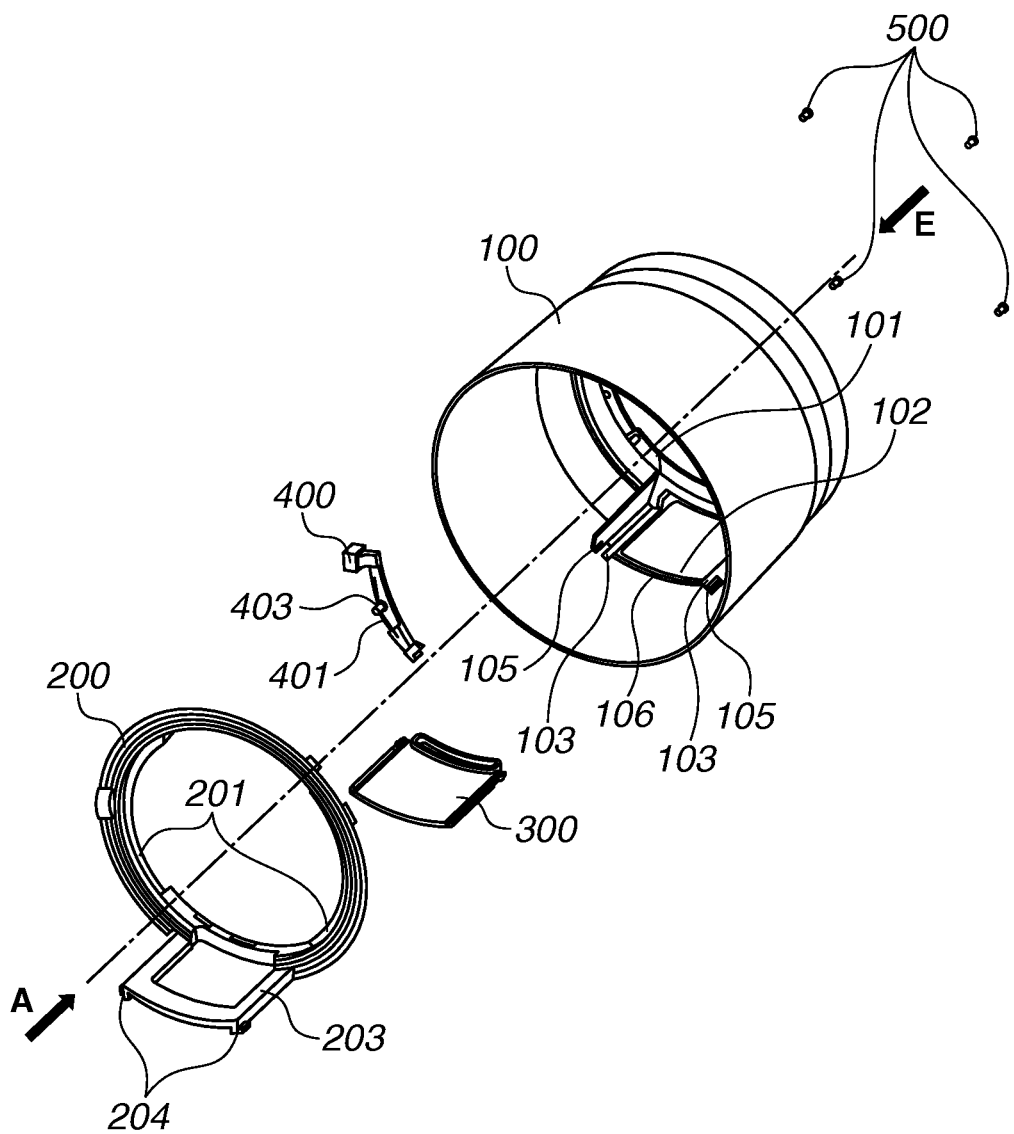
FIG. 1 is an exploded perspective view illustrating a lens hood according to an exemplary embodiment of the present invention.
Figure 2:
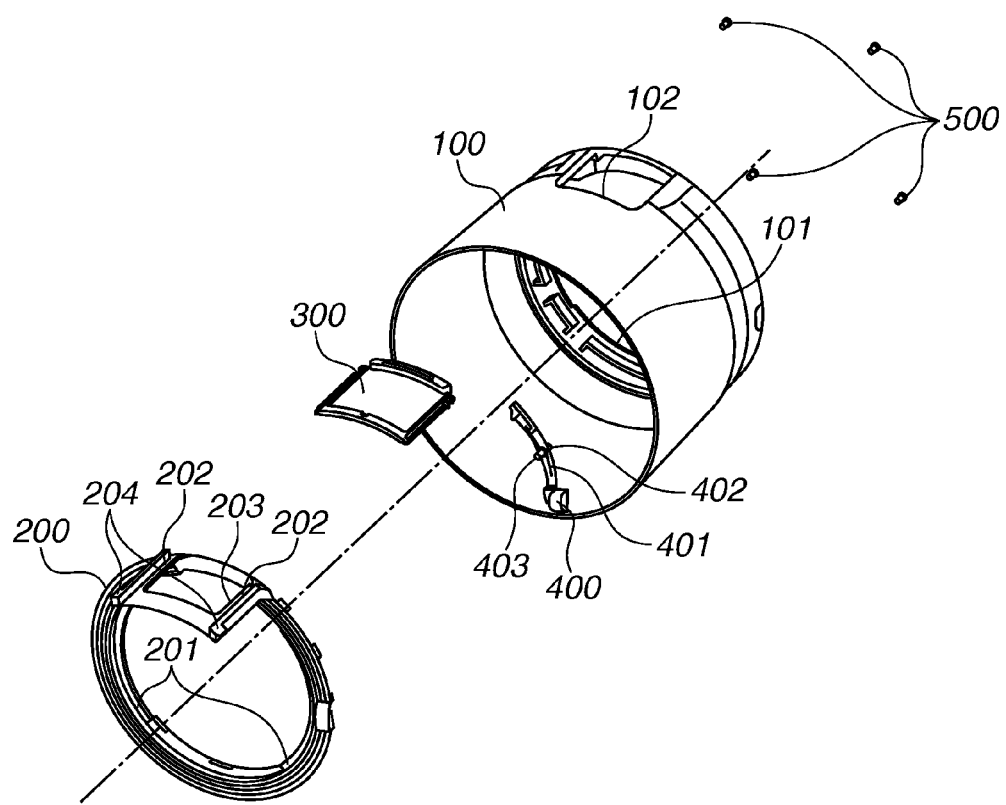
FIG. 2 is an exploded perspective view illustrating the lens hood according to an exemplary embodiment of the present invention.

FIG. 1 is an exploded perspective view illustrating a lens hood according to the first exemplary embodiment. FIG. 2 is an exploded perspective view illustrating the lens hood rotated about the optical axis by 180 degrees with respect to the exploded perspective view illustrated in FIG. 1.

As illustrated in FIGS. 1 and 2, a lens hood 10 includes a hood body (hood base) 100, a cover support member (hood cover) 200, an opening cover member (hood window) 300, a lock lever 400, a torsion spring 401, and fastening screws 500.

The hood body 100 includes an opening 102, first trajectories (first rail portions) 103, first engagement portions (engagement grooves) 105, a first surrounding portion (portion having a shape of a protrusion) 106, and a shaft hole in which a shaft portion 402 of the lock lever 400 is to be fitted. The hood body 100 is a cylindrical member configured to prevent unwanted light from entering the lens barrel 20.

The cover support member 200 includes second trajectories (second rail portions) 202, an opening 203, first projecting portions (engagement claws) 204 projecting from the second trajectories 202, and a shaft hole in which a shaft portion 403 of the lock lever 400 is to be fitted.

The opening cover member 300 is a plate-shaped piece configured to cover the opening 102 formed in the hood body 100 and the opening 203 formed in the cover support member 200.

The first engagement portions 105 of the hood body 100 are formed to be engaged with the first projecting portions 204 of the cover support member 200 and support the cover support member 200 in a direction orthogonal to the optical axis.

The cover support member 200 is fastened to the hood body 100 by the fastening screws 500.

The lock lever 400 includes the shaft portion 402, which is to be fitted into the shaft hole formed in the hood body 100, and the shaft portion 403, which is to be fitted into the shaft hole formed in the cover support member 200. The lock lever 400 is supported by being sandwiched between the hood body 100 and the cover support member 200.

The torsion spring 401 is fitted in the shaft portion 403 of the lock lever 400 and attached to produce biasing force in the direction orthogonal to the optical axis between the lock lever 400 and the cover support member 200. The biasing force produced by the torsion spring 401 causes a front end of the lock lever 400 to abut against an end portion of a bayonet groove 21a formed in a front end portion 21 of a lens barrel 20 to regulate the rotation of the lens hood 10 about the optical axis.

Figure 3:
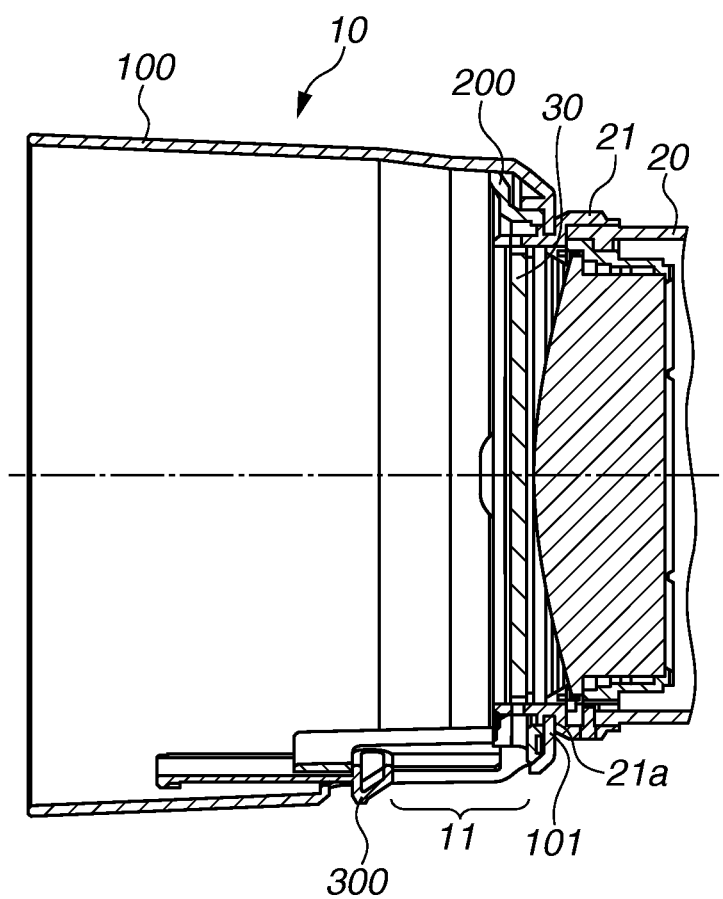
FIG. 3 is a cross sectional view illustrating the lens hood and a lens barrel in an opened state according to an exemplary embodiment of the present invention.
Figure 4:
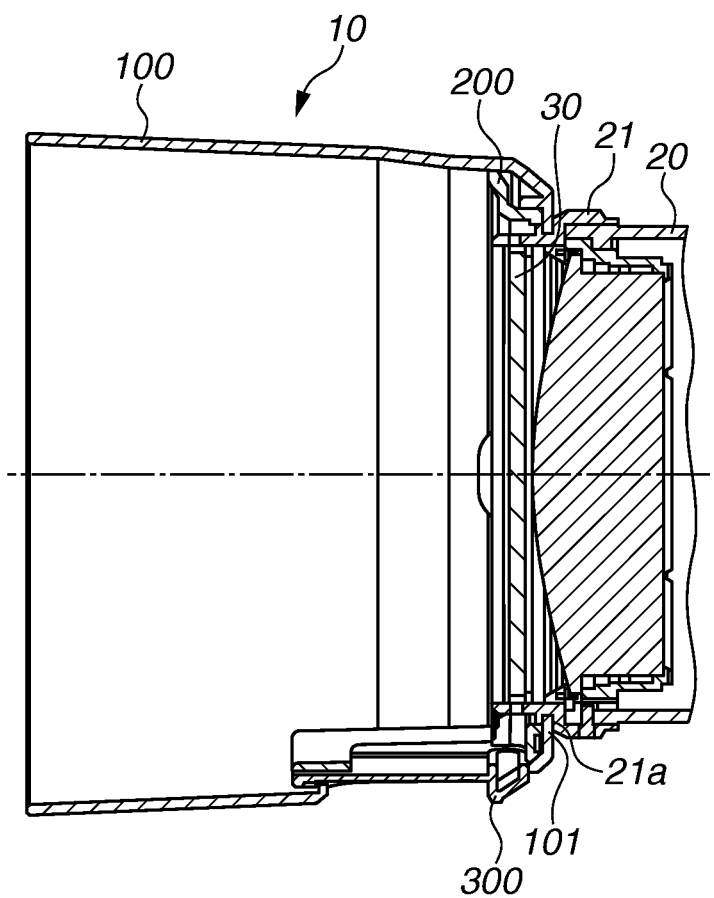
FIG. 4 is a cross sectional view illustrating the lens hood and the lens barrel in a closed state according to an exemplary embodiment of the present invention.
Figure 5:
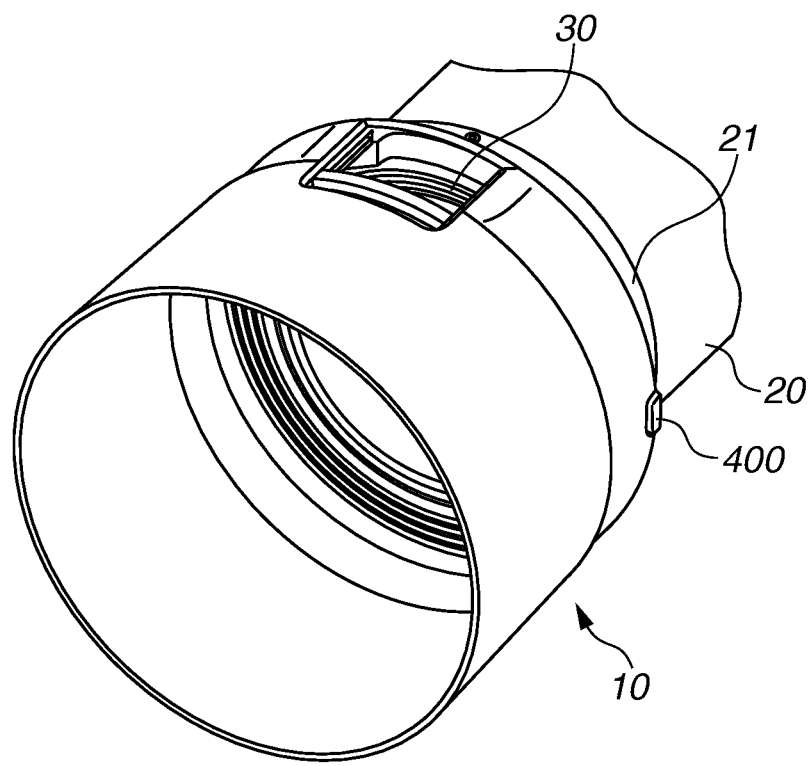
FIG. 5 is a perspective view illustrating the lens hood and the lens barrel in an opened state according to an exemplary embodiment of the present invention.

FIG. 3 is a cross sectional view illustrating the lens hood and the lens barrel (opened state) according to the first exemplary embodiment. FIG. 4 is a cross sectional view illustrating the lens hood and the lens barrel (closed state) according to the first exemplary embodiment. FIG. 5 is a perspective view illustrating the lens hood and the lens barrel (opened state) according to the first exemplary embodiment.

As illustrated in FIGS. 3 to 5, the lens hood 10 is attachable to the front end portion 21 of the lens barrel 20. Further, the opening 11 can be switched between a state in which the opening 11 is closed (this is a state in which the opening cover member covers the entire opening and will be referred to as "closed state" hereinafter) and a state in which the opening 11 is opened (this is a state in which the opening cover member covers only a part of the opening and will be referred to as "opened state" hereinafter) by moving (sliding) the opening cover member 300 in the optical axis direction.

As illustrated in FIG. 3, the opening 11 is opened so that an optical member 30 can be operated easily with the finger and the like through the opening 11. Further, as illustrated in FIG. 4, when the optical member (rotation effect filter) 30 is not operated, the opening 11 (refer to FIG. 3) is closed so that unwanted light can be prevented from entering the lens barrel 20.

As illustrated in FIGS. 3 and 4, the hood body 100 includes a bayonet claw 101 configured to be engaged with the bayonet groove 21a formed in the front end portion 21 of the lens barrel 20. The bayonet claw 101 is engaged with the bayonet groove 21a so that the lens hood 10 is attached to the lens barrel 20.

Figure 6:
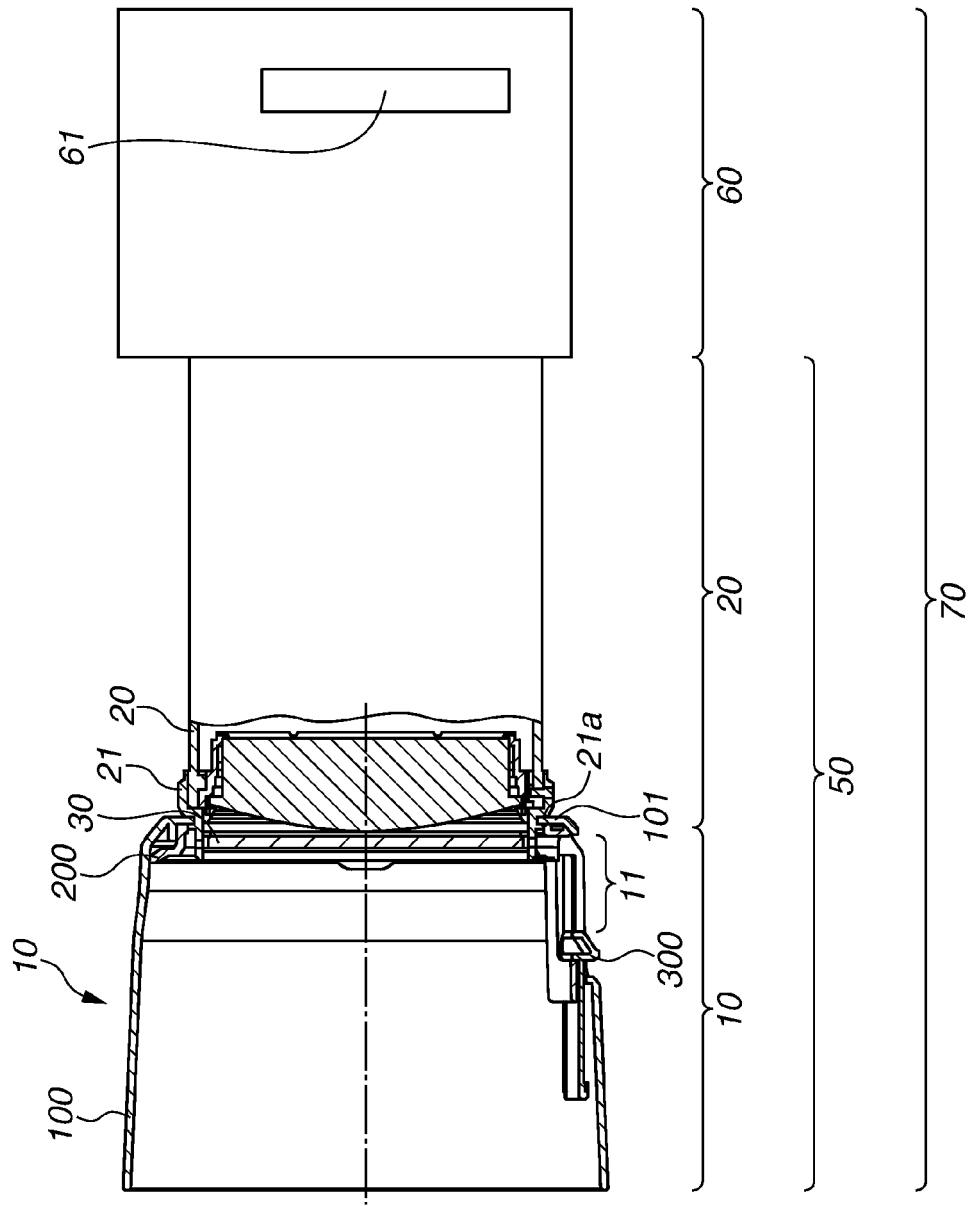
FIG. 6 is a schematic diagram (partially cross sectional view) illustrating the lens hood, the lens barrel, and a camera apparatus according to an exemplary embodiment of the present invention.

FIG. 6 is a schematic diagram (partially a cross sectional view) illustrating the lens hood, the lens barrel, and a camera apparatus according to the first exemplary embodiment.

As illustrated in FIG. 6, a lens apparatus 50 includes the lens barrel 20 and the lens hood 10 attached to the front end portion 21 of the lens barrel 20. Further, an imaging system 70 includes the lens apparatus 50 and a camera apparatus 60 to which the lens apparatus 50 is attached. The camera apparatus 60 includes an image sensor 61 configured to photoelectrically convert an optical image formed by the lens apparatus 50.

Figure 7:
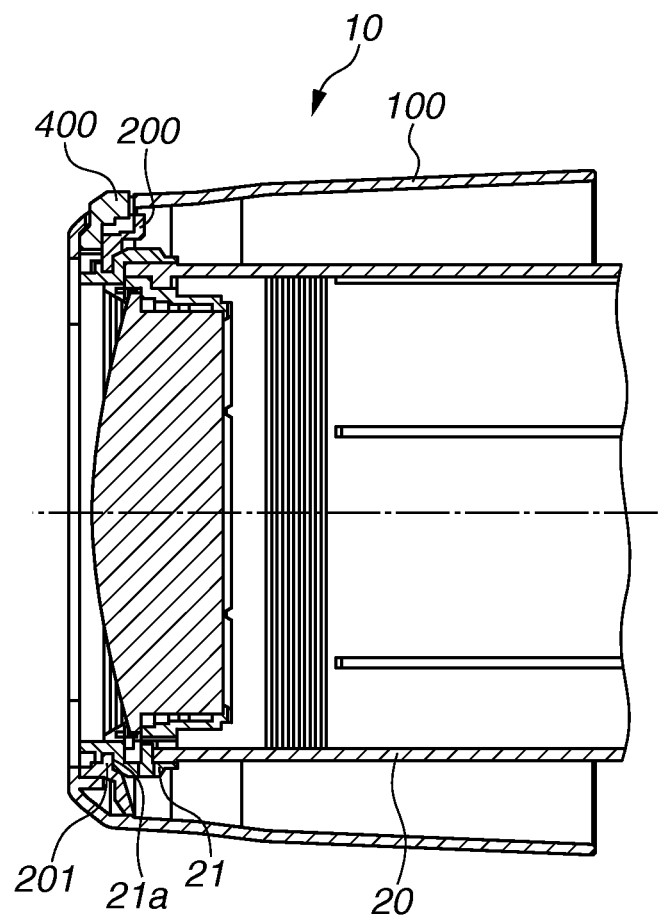
FIG. 7 is a cross sectional view illustrating the lens hood and the lens barrel (attached reversely) according to an exemplary embodiment of the present invention.

FIG. 7 is a cross sectional view illustrating the lens hood and the lens barrel (attached reversely) according to the first exemplary embodiment.

As illustrated in FIG. 7, the cover support member 200 includes a bayonet claw 201, which is to be engaged with the bayonet groove 21a when the lens hood 10 is reversely attached to the lens barrel 20.

Figure 8A:
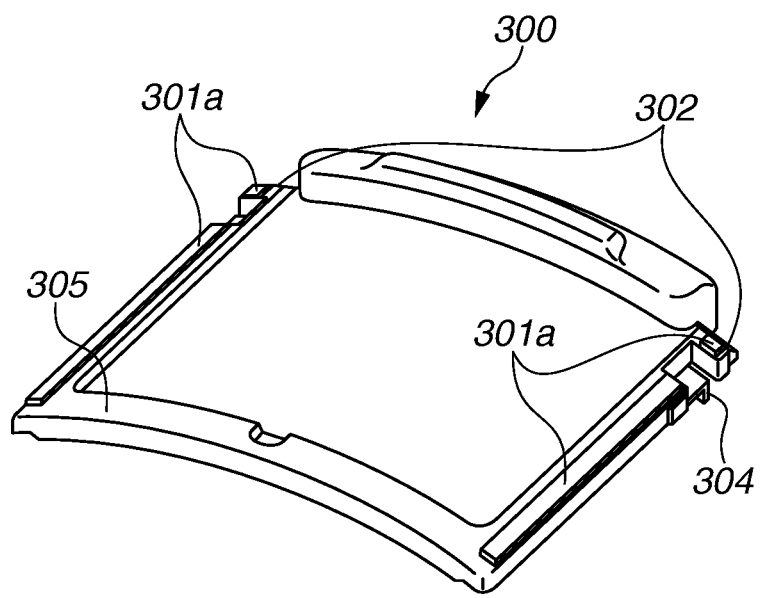
FIGS. 8A and 8B are perspective views illustrating an opening cover member according to an exemplary embodiment of the present invention.
Figure 8B:
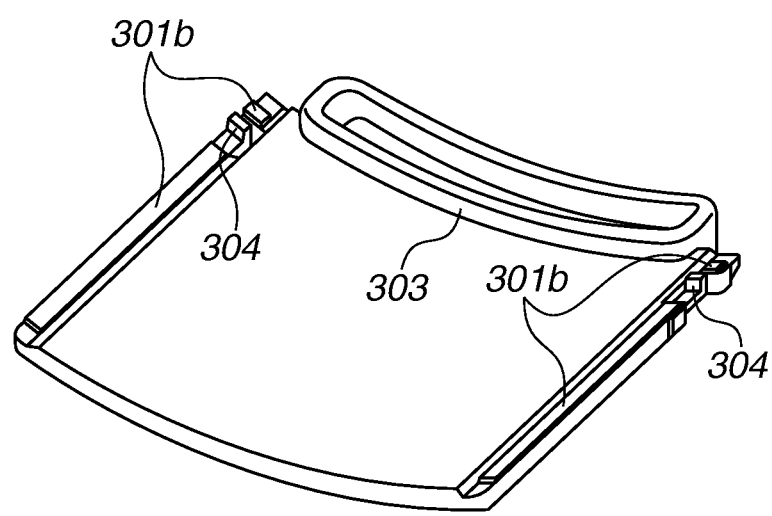

FIGS. 8A and 8B are perspective views illustrating the opening cover member according to the first exemplary embodiment. FIG. 8A is a perspective view of a lower surface, and FIG. 8B is a perspective view of an upper surface ("upper surface" and "lower surface" are based on the state in which the lens hood is attached to the front end portion of the lens barrel).

As illustrated in FIGS. 8A and 8B, the opening cover member 300 includes first sliding portions 301a, second sliding portions 301b, first abutment portions 302, a second abutment portion 303, protrusion portions (leaf spring members) 304, and a second surrounding portion (portion having the shape of a protrusion) 305.

The opening cover member 300 includes the second surrounding portion 305 formed to surround at least a part of the opening 102 (three sides in FIG. 8). The second surrounding portion 305 is configured to overlap the first surrounding portion 106 (refer to FIG. 1) of the hood body 100 when the lens hood 10 is viewed from the optical axis direction or the direction around the optical axis.

While the second surrounding portion is fitted outside the first surrounding portion in the first exemplary embodiment, the second surrounding portion may be fitted inside the first surrounding portion. In this way, a space formed between the hood body 100 and the opening cover member 300 can be covered, whereby the light-blocking structure that can more reliably prevent unwanted light from entering the lens barrel 20 when the lens hood 10 is in the closed state, is realized.

Next, an opening/closing structure of the opening cover member 300 of the lens hood 10 according to the first exemplary embodiment will be described.

FIGS. 9A and 9B illustrate the lens hood according to the first exemplary embodiment. FIG. 9A is a front view viewed from the direction A illustrated in FIG. 1, and FIG. 9B is a rear view viewed from the direction E illustrated in FIG. 1.

Figure 10A:
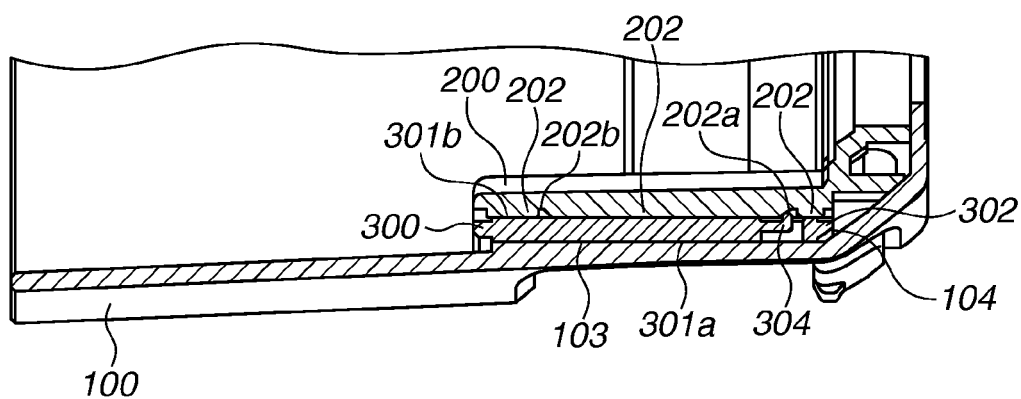
FIGS. 10A and 10B are cross sectional views illustrating a trajectory structure of the lens hood according to an exemplary embodiment of the present invention.
Figure 10B:
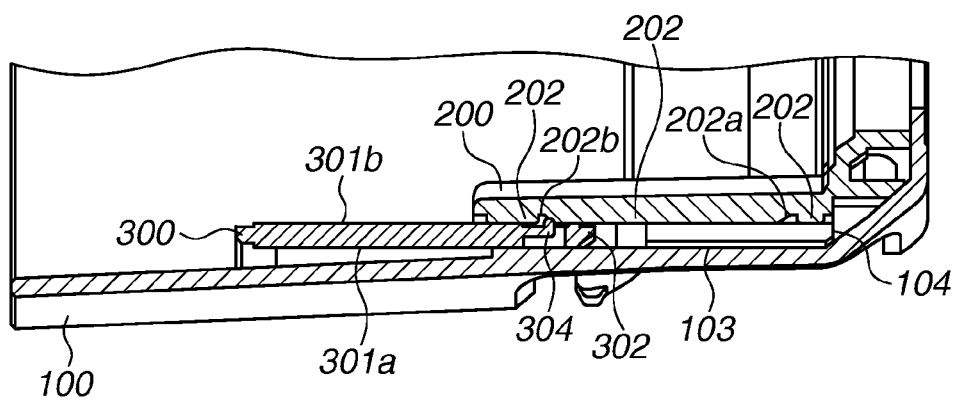

FIGS. 10A and 10B are cross sectional views illustrating a cross section taken along B-B illustrated in FIG. 9A. FIG. 10A is a cross sectional view in the closed state, and FIG. 10B is a cross sectional view in the opened state.

Figure 11:
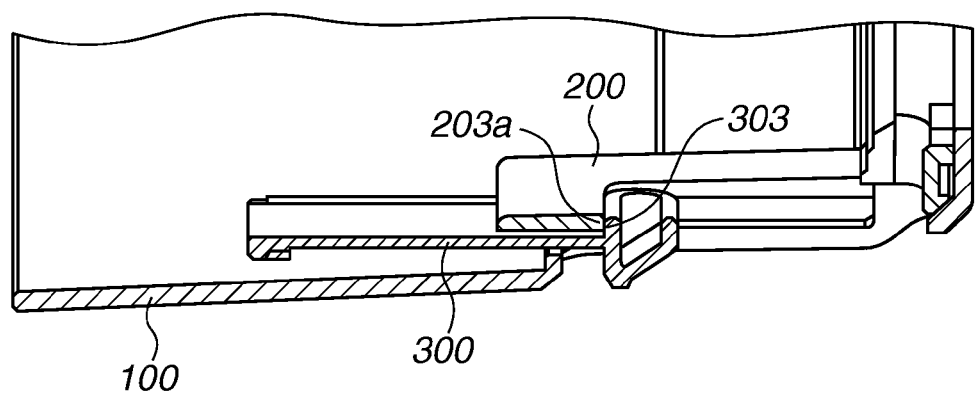
FIG. 11 is a cross sectional view illustrating the lens hood in an opened state according to an exemplary embodiment of the present invention.

FIG. 11 is a cross sectional view illustrating a cross section taken along C-C illustrated in FIG. 9A in the opened stat.

As illustrated in FIGS. 10A, 10B, and 11, the opening 102 of the hood body 100 is formed not to interfere with the opening cover member 300 when the opening cover member 300 is moved between the position of the closed state to the position of the opened state in the optical axis direction. Further, the opening 203 of the cover support member 200 is formed not to interfere with the second abutment portion 303 of the opening cover member 300 between the closed state and the opened state.

As illustrated in FIGS. 10A and 10B, a first abutted portion (closure stopper member) 104 as an abutment portion to be abutted is provided to the opening 102 of the hood body 100. The opening cover member 300 abuts against the first abutted portion 104 in the sliding direction. The first abutted portion 104 is formed so that the abutment portion (first abutment portion) 302 of the opening cover member 300 in the closed state abuts against the first abutted portion 104. In this way, an end position of the opening cover member 300 in the closed state is determined.

As illustrated in FIG. 11, a second abutted portion (opening stopper member) 203a as an abutment portion to be abutted is provided to the opening 203 of the cover support member 200. The opening cover member 300 abuts against the second abutted portion 203a in the sliding direction. The second abutted portion 203a is formed so that the abutment portion (second abutment portion) 303 of the opening cover member 300 in the opened state abuts against the second abutted portion 203a. In this way, an end position of the opening cover member 300 in the opened state is determined.

The opening cover member 300 includes the first sliding portions 301a and the sliding member 301b. The first sliding portions 301a are formed so as to be slidable in the optical axis direction along the first trajectory 103 of the hood body 100. The sliding member 301b is formed so as to be slidable in the optical axis direction along the second trajectory 202 of the cover support member 200. The opening cover member 300 is slidably sandwiched between the first trajectory 103 and the second trajectory 202. Thus, the opening cover member 300 is supported so as to be movable in the optical axis direction by a rail structure unit including the hood body 100 and the cover support member 200.

The length of the first trajectory 103 in the optical axis direction is set so that the first sliding portions 301a of the opening cover member 300 is slidable between the position of the closed state and the position of the opened state. The length of the second trajectory 202 in the optical axis direction is set so that the second sliding portions 301b of the opening cover member 300 is slidable between the position of the closed state and the position of the opened state.

As illustrated in FIG. 10A, in the closed state, the protrusion portions (leaf spring members) 304 of the opening cover member 300 is fitted into a first depressed portion (closure click groove) 202a of the second trajectory 202. In this way, a click feeling is produced when the opening cover member 300 is moved to the position of the closed state and when the opening cover member 300 is moved from the position of the closed state.

As illustrated in FIG. 10B, in the opened state, the protrusion portion (leaf spring member) 304 of the opening cover member 300 is fitted into a first depressed portion (opening click groove) 202b of the second trajectory 202. In this way, a click feeling is produced when the opening cover member 300 is moved to the position of the opened state and when the opening cover member 300 is moved from the position of the opened state.

Such a click structure prevents undesired movement of the opening cover member 300 from the closed state or the opened state even when a shock is applied to the lens hood 10.

According to the first exemplary embodiment, the opening cover member 300 slides between the first trajectory 103 of the hood body 100 and the second trajectory 202 of the cover support member 200 supporting the opening cover member 300 from the direction orthogonal to the optical axis. Thus, the opening cover member 300 is supported in the direction orthogonal to the optical axis and is not likely to be detached even when external force is applied by shocks and the like in the direction orthogonal to the optical axis.

Further, surfaces of the first trajectory 103 and the second trajectory 202 can be made to abut against surfaces of the first sliding portions 301a and the second sliding portions 301b of the opening cover member 300. This makes it possible to ensure sufficient strength against external force in the direction orthogonal to the optical axis, and damage can be prevented in a case where external force is applied in the direction orthogonal to the optical axis.

Further, the abutment portions 302 and 303 of the opening cover member 300 are configured to abut against the abutted portion 104 and an opening stopper member 201a, respectively, so that the opening cover member 300 is not likely to be detached even when external force is applied by a shock and the like in the optical axis direction.

Further, surfaces of the abutment portions 302 and 303 can be made to abut against surfaces of the abutted portion 104 and the opening stopper member 201a. This makes it possible to ensure sufficient strength against external force in the optical axis direction, and damage can be prevented in a case where external force is applied in the optical axis direction.

Further, the protrusion portions 304 for producing a click feeling is located within the space formed by the first sliding portions 301a and the second sliding portions 301b so that an exterior portion of the lens hood 10 is not affected even when the sliding portion of the click structure is scraped. In general, coating having a high light-blocking effect or bristle implanting is applied to the inner peripheral surface (exterior portion) of the lens hood 10, and if the coating or bristle implanting is scraped, the light-blocking effect decreases and the quality is impaired. Thus, the click structure according to the first exemplary embodiment is useful.

A lens hood according to a second exemplary embodiment of the present invention will be described.

Figure 12:
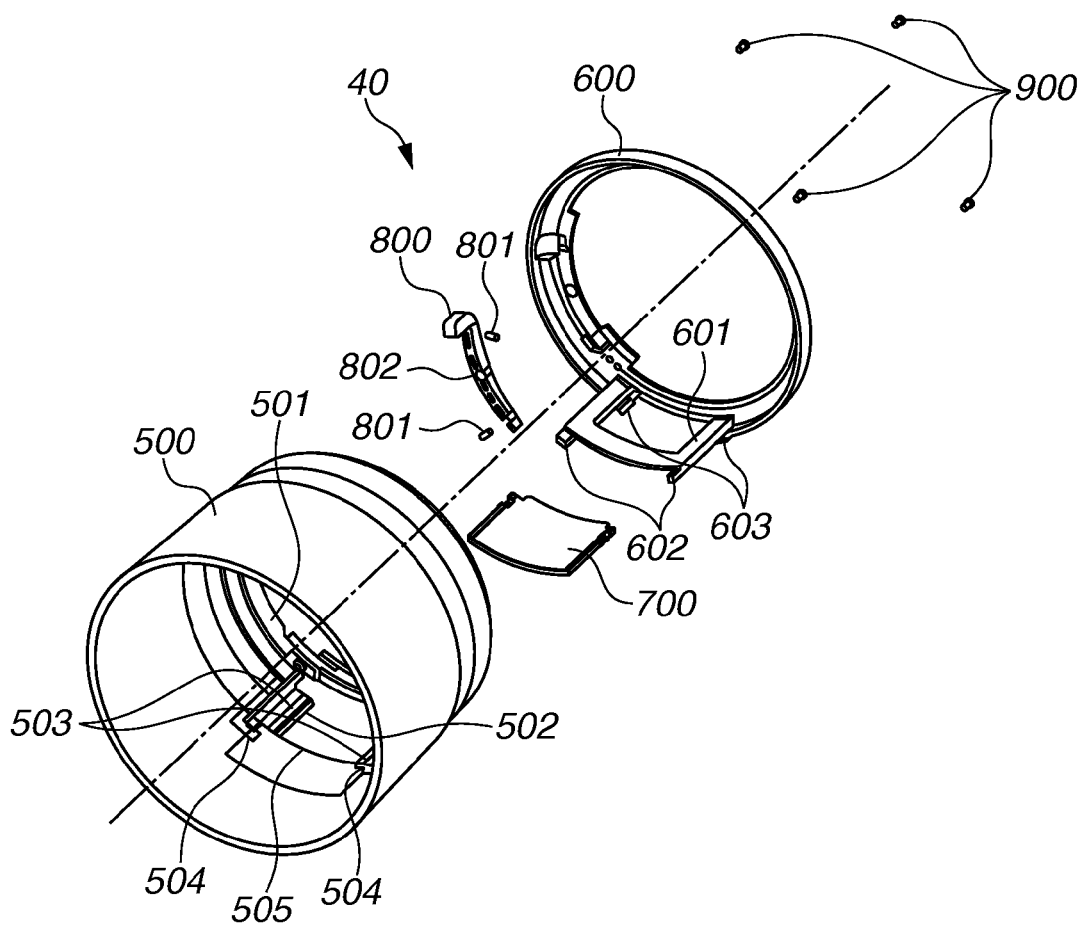
FIG. 12 is an exploded perspective view illustrating a lens hood according to an exemplary embodiment of the present invention.

FIG. 12 is an exploded perspective view illustrating the lens hood according to the second exemplary embodiment.

As illustrated in FIG. 12, a lens hood 40 includes a hood body (hood base) 500, a cover support member (hood cover) 600, an opening cover member (hood window) 700, a lock lever 800, coil springs 801, and fastening screws 900.

The hood body 500 includes a bayonet claw 501, which is to be engaged with the bayonet groove 21a formed in the front end portion 21 of the lens barrel 20. The bayonet claw 501 is engaged with the bayonet groove 21a so that the lens hood 40 is attached to the lens barrel 20.

The hood body 500 is a cylindrical member configured to prevent unwanted light from entering the lens barrel 20. Further, the hood body 500 includes an opening 502, a first trajectories (first rail portions) 503, first engagement portions (engagement grooves) 504, a first surrounding portion (portion having the shape of a protrusion) 505, and a shaft portion (not illustrated) which is to be fitted in the shaft hole 802 of the lock lever 800.

The cover support member 600 includes an opening 601, first projecting portions (engagement claws) 602, abutted portions (closure stopper members) 603, and a second trajectory (second rail portion) (not illustrated). The first projecting portions (engagement claws) 602 project from the second trajectory.

The opening cover member 700 includes sliding members 701a and 701b, first abutment portions 702, a second abutment portion 703, protrusion portions (leaf spring members) 704, and a second surrounding portion (portion having the shape of a protrusion) 705.

The lock lever 800 includes a shaft hole 802, and the shaft portion (not illustrated) of the hood body 500 is fitted into the shaft hole 802. The lock lever 800 is supported by being sandwiched between the hood body 500 and the cover support member 600 with the shaft portion of the hood body 500 being fitted in the shaft hole 802.

The coil springs 801 are attached so as to stretch between the hood body 500 and the lock lever 800. With the coil springs 801, the lock lever 800 generates biasing force in the direction orthogonal to the optical axis, and the front end of the lock lever 800 abuts against the end portion of the bayonet groove 21a formed in the front end portion 21 of the lens barrel 20 to regulate the rotation of the lens hood 40 about the optical axis.

The cover support member 600 is fastened to the hood body 500 by the fastening screws 900.

Figure 14:
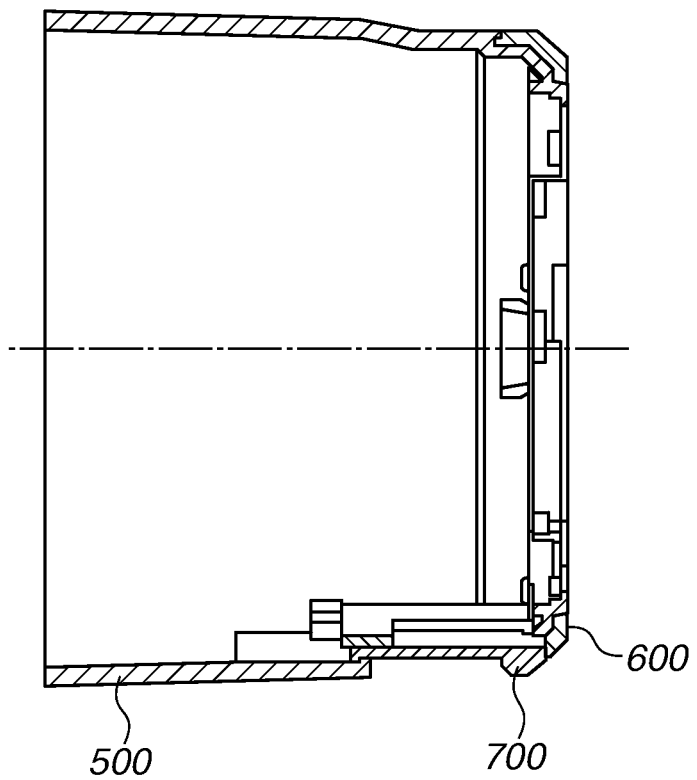
FIG. 14 is a cross sectional view illustrating the lens hood according to an exemplary embodiment of the present invention.

The structure according to the first exemplary embodiment is a multilayer structure including the hood body 100 and the cover support member 200 in this order from the front end portion of lens barrel in the optical axis direction. On the other hand, the second exemplary embodiment is different from the first exemplary embodiment in that the multilayer structure includes the cover support member 600 and the hood body 500 in this order from the front end portion of the lens barrel in the optical axis direction (refer to FIG. 14).

Further, in the structure according to the first exemplary embodiment, the cover support member 200 is attached from the object side of the hood body 100 (the cover support member 200 is passed through the inside of the hood body 100). On the other hand, the second exemplary embodiment is different from the first exemplary embodiment in that the cover support member 600 is attached from the image side of the hood body 500 (the cover support member 200 is not passed through the inside of the hood body 100).

Figure 13A:
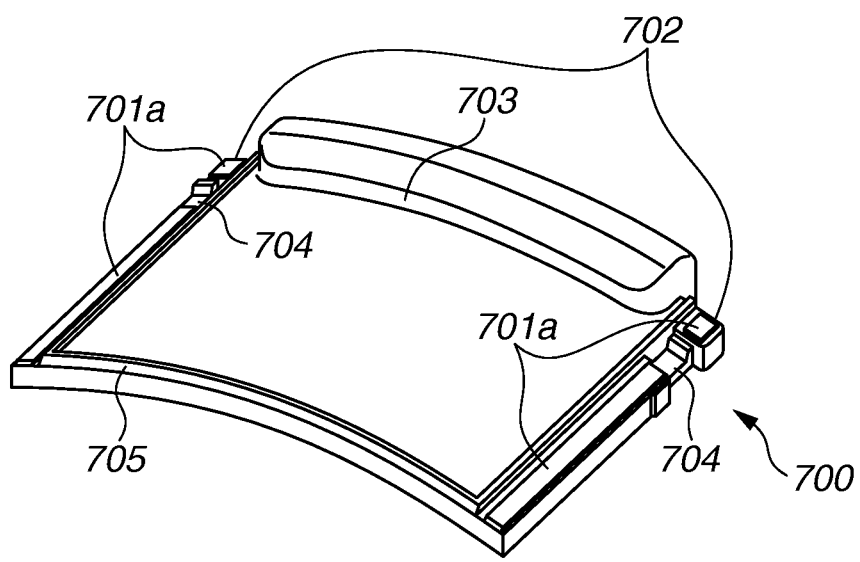
FIGS. 13A and 13B are perspective views illustrating an opening cover member according to an exemplary embodiment of the present invention.
Figure 13B:
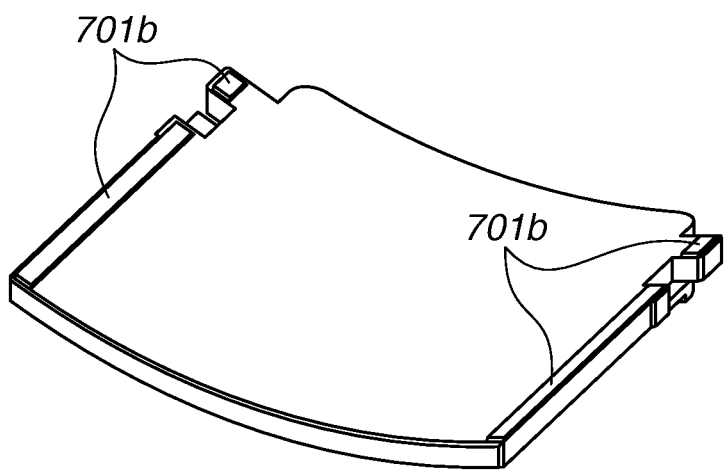

FIGS. 13A and 13B are perspective views illustrating the opening cover member according to the second exemplary embodiment. FIG. 13A is a perspective view of a lower surface, and FIG. 13B is a perspective view of an upper surface ("upper surface" and "lower surface" are based on the state in which the lens hood is attached to the front end portion of the lens barrel).

As illustrated in FIGS. 13A and 13B, the opening cover member 700 includes the first sliding members 701a, the second sliding portions 701b, the first abutment portions 702, the second abutment portion 703, the protrusion portions (leaf spring members) 704, and the second surrounding portion (portion having the shape of a protrusion) 705.

The opening cover member 700 includes the second surrounding portion 705 formed to surround at least a part of the opening 502 (three sides in FIGS. 13A and 13B). The second surrounding portion 705 is configured to overlap the first surrounding portion 505 (refer to FIG. 12) of the hood body 500 when the lens hood 40 is viewed from the optical axis direction or the direction around the optical axis.

Next, the opening/closing structure of the opening cover member 700 of the lens hood 40 according to the second exemplary embodiment will be described.

The opening 502 of the hood body 500 is formed not to interfere with the opening cover member 700 when the opening cover member 700 is moved between the position of the closed state and the position of the opened state in the optical axis direction. The length of the first trajectories 503 in the optical axis direction are set so that the first sliding members 701a of the opening cover member 700 are slidable between the position of the closed state and the position of the opened state.

The first engagement portions 504 of the hood body 500 are formed to be engaged with the first projecting portions 602 of the cover support member 600 and support the cover support member 600 in the direction orthogonal to the optical axis.

The opening 601 of the cover support member 600 is formed not to interfere with the opening cover member 700 between the closed state and the opened state.

The opening 601 of the cover support member 600 includes the first abutted portions 603 as an abutment portion to be abutted, and the opening cover member 700 abuts against the first abutted portions 603 in the sliding direction. The first abutted portions 603 are formed so that the first abutment portions 702 of the opening cover member 700 in the closed state abut against the first abutted portions 603. In this way, an end position of the opening cover member 700 in the closed state is determined.

A second abutted portion (surface of the opening 502 on the object side) as an abutted portion is provided in the opening 502 of the hood body 500, and the opening cover member 700 abuts against the second abutted portion in the sliding direction. The second abutted surface is formed so that the second abutment portion 703 of the opening cover member 700 in the opened state abuts against the second abutted surface. In this way, an end position of the opening cover member 700 in the opened state is determined.

The length of the second trajectories (not illustrated) in the optical axis direction is set so that the sliding portions 701b of the opening cover member 700 are slidable between the position of the closed state and the position of the opened state.

In the closed state, the protrusion portions (leaf spring member) 704 of the opening cover member 700 are fitted into first depressed portions (closure click grooves (not illustrated)) of the second trajectories (not illustrated). In this way, a click feeling is produced when the opening cover member 700 is moved to the position of the closed state and when the opening cover member 700 is moved to the position of the closed state.

In the opened state, the protrusion portions (leaf spring member) 704 of the opening cover member 700 is fitted into second depressed portions (opening click grooves (not illustrated)) of the second trajectories (not illustrated). In this way, a click feeling is produced when the opening cover member 700 is moved to the position of the opened state and when the opening cover member 700 is moved from the position of the opened state.

Such a click structure prevents undesirable movement of the opening cover member 700 from the closed state or the opened state even when a shock is applied to the lens hood 40.

According to the second exemplary embodiment, the opening cover member 700 slides between the first trajectories 503 of the hood body 500 and the second trajectories (not illustrated) of the cover support member 600 supporting the opening cover member 700 from the direction orthogonal to the optical axis. Thus, the opening cover member 700 is supported in the direction orthogonal to the optical axis and is not likely to be detached even when external force is applied by shocks and the like in the direction orthogonal to the optical axis.

Further, surfaces of the first trajectories 503 and the second trajectories (not illustrated) may abut against surfaces of the first sliding portions 701a and the second sliding portions 701b of the opening cover member 700. This makes it possible to ensure sufficient strength against external force in the direction orthogonal to the optical axis, and damage can be prevented in a case where external force is applied in the direction orthogonal to the optical axis.

In general, bristle implanting or antireflection coating is applied to the inner side of a hood body. According to the second exemplary embodiment, since the cover support member 600 does not have to be passed through the inside of the hood body to attach the cover support member 600 so that the bristle implanting or the antireflection coating is not likely to be damaged at the time of attaching the hood cover, which is desirable.

While the various exemplary embodiments of the present invention has been described, the scope of the invention is not limited to the exemplary embodiments, and various modifications and changes can be made within the spirit of the invention.

In the first exemplary embodiment, the abutted portions (closure stopper members) are provided to the hood body, and the abutted portions (opening stopper members) are provided to the cover support member. Further, in the second exemplary embodiment, the abutted portions (closure stopper members) are provided to the cover support member, and the abutted portions (opening stopper members) are provided to the hood body. However, the abutted portions (closure stopper members and opening stopper members) may be provided to either of the hood body and the cover support member.

Further, the protrusion portions (leaf spring members) are provided to the opening cover member, and the first and second depressed portions (collectively referred to as "depressed portions") to be fitted into the protrusion portions are provided to the second trajectories. However, the protrusion portions may be provided to the opening cover member, and the first and second depressed portions to be fitted in the protrusion portions may be provided to the first trajectories.

Further, while the configuration in which the first projecting portions (engagement claws) of the cover support member are to be fitted into the first engagement portions (engagement grooves) provided to the hood body is described, the second projecting portions (engagement claws) may be provided to the hood body, and the second engagement portions (engagement grooves) may be provided to the cover support member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-228486, filed Nov. 10, 2014, which is hereby incorporated by reference herein in its entirety.

What is claimed is:

1. A lens hood attachable to a front end portion of a lens barrel, the lens hood comprising:
a hood body with which an opening is formed;
an opening cover member configured to cover the opening; and
a cover support member configured to slidably fix the opening cover member to the hood body,
wherein the hood body or the cover support member includes a first abutted portion and a second abutted portion configured to abut against the opening cover member in a direction in which the opening cover member slides.

2. The lens hood according to claim 1,
wherein the hood body includes a first rail portion and the cover support member includes a second rail portion, and
wherein the first rail portion and the second rail portion are configured to slidably sandwich the opening cover member.

3. The lens hood according to claim 2, wherein the cover support member includes a first projecting portion projecting from the second rail portion, and the hood body includes a first engagement portion configured to be engaged with the first projecting portion.

4. The lens hood according to claim 2, wherein the hood body includes a second projecting portion projecting from the first rail portion, and the cover support member includes a second engagement portion configured to be engaged with the second projecting portion.

5. The lens hood according to claim 2, further comprising a click structure configured to produce a click feeling, the click structure including a depressed portion formed in the first rail portion or the second rail portion and a protrusion portion formed on the opening cover member and configured to be fitted in the depressed portion.

6. The lens hood according to claim 5, wherein the protrusion portion is a leaf spring member.

7. The lens hood according to claim 1, further comprising a light-shielding structure including a first surrounding portion formed on the hood body to surround at least a part of the opening and a second surrounding portion formed on the opening cover member to be fitted inside or outside the first surrounding portion.

8. The lens hood according to claim 1, wherein the opening cover member is undetachable from the cover support member.

9. A lens apparatus comprising:
a lens barrel; and
a lens hood attachable to a front end portion of the lens barrel,
wherein the lens hood comprises:
a hood body with which an opening is formed;
an opening cover member configured to cover the opening; and
a cover support member configured to slidably fix the opening cover member to the hood body,
wherein the hood body or the cover support member includes a first abutted portion and a second abutted portion configured to abut against the opening cover member in a direction in which the opening cover member slides.

10. An imaging system comprising:
a camera apparatus including an image sensor; and
a lens apparatus attachable to and detachable from the camera apparatus,
wherein the lens apparatus comprises:
a lens barrel; and
a lens hood attachable to a front end portion of the lens barrel,
wherein the lens hood comprises:
a hood body with which an opening is formed;
an opening cover member configured to cover the opening; and
a cover support member configured to slidably fix the opening cover member to the hood body,
wherein the hood body or the cover support member includes a first abutted portion and a second abutted portion configured to abut against the opening cover member in a direction in which the opening cover member slides.

11. A lens hood attachable to a front end portion of a lens barrel, the lens hood comprising:
a hood body with which an opening is formed;
an opening cover member configured to cover the opening; and
a cover support member configured to slidably fix the opening cover member to the hood body,
wherein one of the hood body and the cover support member includes a first abutted portion and the other includes a second abutted portion,
wherein the first abutted portion and the second abutted portion are configured to abut against the opening cover member in a direction in which the opening cover member slides.

12. A lens apparatus comprising:
a lens barrel; and
a lens hood attachable to a front end portion of the lens barrel,
wherein the lens hood comprises:
a hood body with which an opening is formed;
an opening cover member configured to cover the opening; and
a cover support member configured to slidably fix the opening cover member to the hood body,
wherein one of the hood body and the cover support member includes a first abutted portion and the other includes a second abutted portion,
wherein the first abutted portion and the second abutted portion are configured to abut against the opening cover member in a direction in which the opening cover member slides.

13. An imaging system comprising:
a camera apparatus including an image sensor; and
a lens apparatus attachable to and detachable from the camera apparatus,
wherein the lens apparatus comprises:
a lens barrel; and
a lens hood attachable to a front end portion of the lens barrel,
wherein the lens hood comprises:
a hood body with which an opening is formed;
an opening cover member configured to cover the opening; and
a cover support member configured to slidably fix the opening cover member to the hood body,
wherein one of the hood body and the cover support member includes a first abutted portion and the other includes a second abutted portion,
wherein the first abutted portion and the second abutted portion are configured to abut against the opening cover member in a direction in which the opening cover member slides.

14. A lens hood attachable to a front end portion of a lens barrel, the lens hood comprising:
a hood body with which an opening is formed;
an opening cover member configured to cover the opening;
a cover support member configured to slidably fix the opening cover member to the hood body; and
a first abutted portion and a second abutted portion configured to abut against the opening cover member in a direction in which the opening cover member slides.

15. A lens apparatus comprising:
a lens barrel; and
a lens hood attachable to a front end portion of the lens barrel,
wherein the lens hood comprises:
a hood body with which an opening is formed;
an opening cover member configured to cover the opening;
a cover support member configured to slidably fix the opening cover member to the hood body; and
a first abutted portion and a second abutted portion configured to abut against the opening cover member in a direction in which the opening cover member slides.

16. An imaging system comprising:
a camera apparatus including an image sensor; and
a lens apparatus attachable to and detachable from the camera apparatus,
wherein the lens apparatus comprises:
a lens barrel; and
a lens hood attachable to a front end portion of the lens barrel,
wherein the lens hood comprises:
a hood body with which an opening is formed;
an opening cover member configured to cover the opening;
a cover support member configured to slidably fix the opening cover member to the hood body; and
a first abutted portion and a second abutted portion configured to abut against the opening cover member in a direction in which the opening cover member slides.

* * * * *